Aug. 16, 1932.     A. G. F. WALLGREN     1,871,485
BEARING
Filed May 14, 1928     2 Sheets-Sheet 1
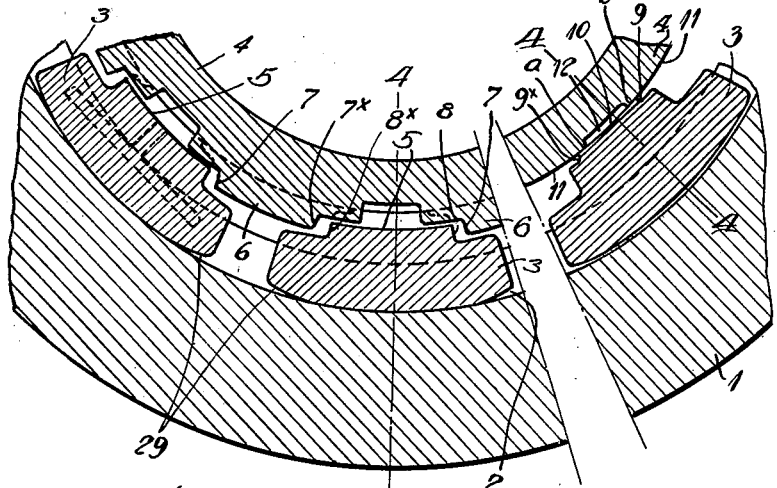
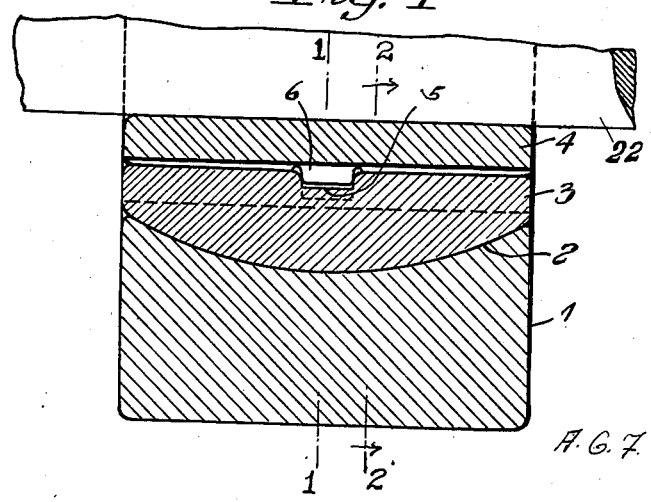

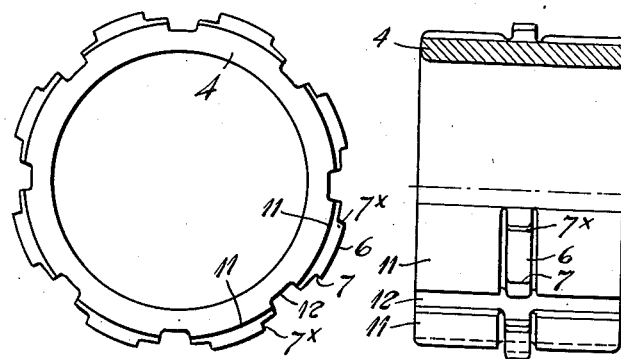
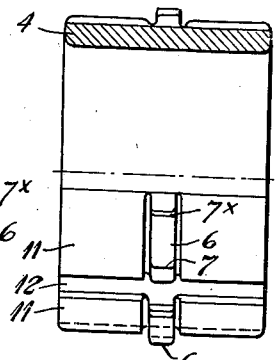
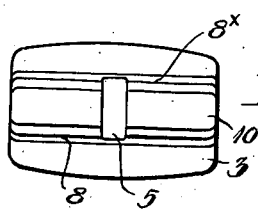
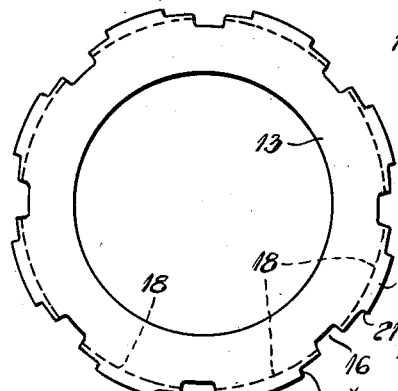
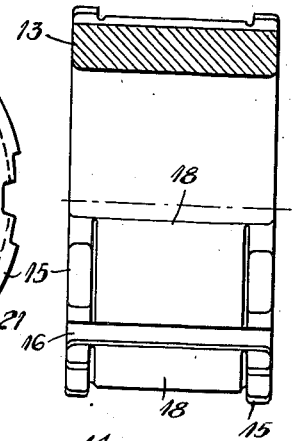
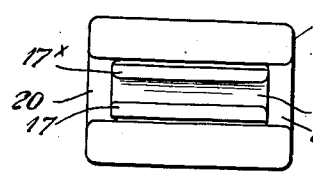

Patented Aug. 16, 1932                                                    1,871,485

UNITED STATES PATENT OFFICE

AUGUST GUNNAR FERDINAND WALLGREN, OF STOCKHOLM, SWEDEN, ASSIGNOR TO AKTIEBOLAGET NOMY, OF STOCKHOLM, SWEDEN, A CORPORATION OF SWEDEN

BEARING

Application filed May 14, 1928, Serial No. 277,769, and in Sweden May 18, 1927.

My invention relates to bearings. More particularly my invention relates to shaft bearings. Still more particularly my invention relates to bearings of the type wherein bearing blocks are used which are tilted on shaft rotation to provide wedge-shaped oil spaces. In this type of bearing, my invention is more particularly related to radial type bearings as distinguished from thrust bearings.

My invention has for one of its objects to improve the efficiency of bearings and particularly to increase the load capacity of radial type bearings. Further objects of the invention are: to reduce friction losses; to simplify construction of heavy duty bearings; and to provide a bearing which will work efficiently and with equal effect in either direction of rotation.

Further objects and the nature and advantages of the invention will become apparent from consideration of the following description taken in conjunction with the accompanying drawings forming part of the specification and showing several forms of the invention.

With reference to the drawings:

Fig. 1 is a cross-sectional view of a bearing of the radial type embodying the invention, taken on the line 1—1 of Fig. 4;

Fig. 2 is a cross-sectional view taken on the line 2—2 of Fig. 4;

Fig. 3a is a cross-sectional view showing a bearing block tilted for one direction of rotation;

Fig. 3b is a cross-sectional view showing a bearing block tilted for the other direction of rotation;

Fig. 4 is an axial cross-section taken on the line 4—4 of Fig. 1 and the line 4—4 of Fig. 2;

Fig. 5 is an end view of a rotary member forming part of the bearing;

Fig. 6 is a side view, partly in cross-section, of the rotary member;

Fig. 7 is a view of a bearing block looking towards its inner side when in position;

Fig. 8 is a side view of a rotary member of modified construction;

Fig. 9 is a side view, partly in section, of the rotary member shown in Fig. 8; and Fig. 10 is a view of a bearing block adapted to be used with the rotary member shown in Fig. 8 and Fig. 9.

Referring to Figs. 1–7, the bearing illustrated comprises a stationary member 1. Member 1 surrounds the shaft and may, if desired, be made of two parts suitably held together. Member 1 might be termed an outer ring or race ring. Within member 1 is an inner ring or rotary member 4 which is fixed to the shaft and which may, likewise, be made of two parts. Radially between the rotary and stationary members is a series of bearing blocks 3. Member 1 has a spherical inner surface 2. Bearing blocks 3 have outer spherical surfaces adjacent to and co-operating with surface 2. The blocks 3 are carried with the rotary member 4 in rotation and the spherical surfaces are the bearing surfaces which slide relative to each other.

Each block 3 has a transverse groove 5 (see Fig. 4 and Fig. 7). Projections 6 on member 4 extend into grooves 5. The purpose of this is to prevent relative axial movement of blocks 3 and rotary member 4. Projections 6 have another purpose, to provide abutment surfaces for engaging the blocks to move them rotationally with member 4. Each projection 6 has symmetrically disposed radially offset surfaces providing, due to the offset, abutment surfaces 7 and $7^x$. Each block works in the space between an abutment surface 7 of one projection 6 and the abutment surface $7^x$ of the next projection 6. Each block is provided with radially offset surfaces providing, due to the offset, abutment surfaces 8 and $8^x$. Surfaces 7, $7^x$, 8 and $8^x$ extend axially and substantially radially. The surfaces 7 constitute abutments for surfaces 8 and surfaces $7^x$ constitute abutments for surfaces $8^x$.

At each side of the central grooves 5, each block is shaped as shown in Fig. 2. There is an inner surface 10 on each block at the edges of which are offsets 9 and $9^x$ extending axially. Midway between adjacent projections 6 are axial grooves 12 extending the full width of the outer surface 11 of rotary member 4 (see Fig. 6). The portions of surfaces 11 adjacent to the grooves 12 form what may be termed shoulders against which cooperating surfaces of the blocks abut in a manner hereinafter to be more fully described. Surfaces 10 have greater circumferential or peripheral extent than grooves 12.

The edges 29 of blocks 3 are preferably beveled to facilitate entrance of oil between the spherical surfaces of the blocks and the stationary member 1.

The mode of operation is as follows:

Figs. 1, 2 and 4 show the blocks in what may be termed central position. A part of the surface 10 to each side of groove 12 is in contact with one of the shoulders formed by the outer surface 11 of rotary member 4. These surfaces in contact in middle position are designated by reference characters $a$ and $b$. The bearing load is sustained by the surfaces $a$ and $b$ of the blocks on the underside of the bearing. Assume now that the shaft, indicated at 22 in Fig. 4, is rotated in the direction indicated by the arrow in Fig. 3a. The inner rotary member 4 being carried by the shaft will rotate therewith. If we select the lowermost block and consider its travel, it may first follow along with member 4 with both block surfaces $a$ and $b$ in contact with member 4 as shown in Fig. 2. When this block rotates to a position above the center line of the shaft so that the load no longer affects it, and due to the greater friction between the block and surface 2 than between the block and rotary member 4, the block now lags behind rotary member 4 in travel. This lag can only take place for a short time since the abutment surface $7^x$ of the projection which is back of the block in the line of travel advances relative to the block and meets surface $8^x$. This position is shown in Fig. 3a. In this relative movement of the block and the rotary member, block surface $a$ has moved backwards, so to speak, and is still held outwardly in radial direction by the shoulder portion of surface 11 at the edge of groove 12. On the other hand, block surface $b$ has moved back so as to go entirely within groove 12. This side of the block, on the forward side, can now move into groove 12. The other surfaces are so positioned as to permit this movement whereupon the block tilts as shown in Fig. 3a, the block surface $a$ being held outwardly by the shoulder portion of surface 11 and the block surface $b$ moving inwardly into groove 12. This tilting of the block moves the forward end of the spherical contact surface of the block away from the surface 2 forming the wedge-shaped oil space which gives the high load capacity.

The bearing blocks may be termed floating blocks since they are not tied to rotary member 4 but have shift of position with respect to both members 1 and 4, the shift of position with respect to the rotary member 4 being, however, limited by the abutment surfaces 7 and $7^x$.

The block is in effect tilted at the after edge of groove 12, with reference to the line of travel and will adjust itself to a position most suitable to factors of load, speed of revolution and characteristics such as viscosity of the oil. By using a spherical surface 2 relative axial displacement of the parts is prevented and the shaft may be out of alignment with respect to the stationary member 1. The bearing is completely self-adjusting even if the shaft is curved.

If the rotation of the shaft is reversed, each block will take the position shown in Fig. 3b. The relation is exactly the same except that the tilting takes place in the other way, that is in opposite sense or angle. The block surface $b$ is in this case held outwardly by the shoulder portion of surface 11 at the opposite edge of groove 12 and block surface $a$ slips into groove 12. In either direction of rotation, oil enters the wedge-shaped spaces between the blocks and spherical bearing surface 2 and constitutes a film having a large capacity for supporting the blocks 3, member 4 and shaft so that the bearing operates with a minimum of friction. In passing from the position shown in Fig. 3a to the position shown in Fig. 3b, the blocks must, of course, pass through the central position shown in Fig. 2. Obviously the surface 2 and the co-operating surface of the blocks need not be spherical but may, for example, be cylindrical. For the best utilization of the invention, however, I prefer the spherical surface for reasons above given.

In the embodiment shown in Figs. 8, 9 and 10, instead of having a set of projections centrally disposed, there are two sets of projections 15 at the ends of the rotary member 13. Member 13 corresponds to member 4 of the first described embodiment and projections 15 correspond to and have the same function as projections 6. Grooves 16 correspond to grooves 12. In central position, each block bears against shoulder surfaces 18 to each side of the groove. The co-operating surfaces of the block are 17 and $17^x$ between which is a groove 19. At each end of each block is a recess 20 corresponding to groove 5 of the previously described embodiment. The sides of recesses 20 co-operate with abutment surfaces 21 and $21^x$ on projections 15 in the same manner as surfaces 7, $7^x$, 8 and $8^x$ of the first described embodiment.

The embodiment of Figs. 8–10 operates in the same manner as the previously described embodiment. Depending on the direction of rotation, either surface 17 or $17^x$ slips into groove 16, thus tilting the block. The inner sides of projections 15 co-operate with the ends of the raised portions having surfaces 17 and $17^x$ to prevent axial movement of the blocks. The bearing surfaces on the outer sides of the blocks may be of various shapes including cylindrical, spherical and double-cone shape.

In order to make the blocks somewhat yieldable, they may be provided with slits as shown in dotted lines in Fig. 1. The blocks may be hollow or made of light metal in order to reduce the weight of the blocks and consequently the centrifugal force effect.

While I have shown a few forms of apparatus embodying the invention, the invention may obviously be embodied in a variety of other forms and is not limited to the embodiments given by way of example.

I claim:

1. A bearing of the radial type comprising an inner member, an outer member spaced radially from the inner member, a plurality of bearing blocks having operative positions radially between said members, one of said members and said blocks having cooperating surfaces for causing rotation in one direction to tilt the blocks one way and rotation in the other direction to tilt the blocks the other way, and means for permitting and limiting shift of position between said blocks and said one of said members.

2. A bearing of the radial type comprising an inner member, an outer member spaced radially from the inner member, a plurality of bearing blocks having operative positions between said members, one of said members and said blocks having adjacent cooperating irregular surfaces for causing rotation in one direction to tilt the blocks one way and rotation in the other direction to tilt the blocks the other way, and the other member and said blocks having adjacent cooperating spherical bearing surfaces, and means for permitting and limiting shift of position between said blocks and said one of said members.

3. A bearing of the radial type comprising a stationary member, a rotary member and a plurality of bearing blocks having operative positions radially between said members and arranged to slide with respect to said stationary member and having limited shift of position with respect to said rotary member, said rotary member and said blocks having co-operating surfaces for causing the blocks to tilt on rotation due to said shift of position and said stationary member and said blocks having co-operating spherical bearing surfaces.

4. A bearing of the radial type comprising a stationary member, a rotary member and a plurality of bearing blocks having operative positions radially between said members and arranged to have sliding bearing relation with respect to one of said members and having limited shift of position with respect to the other of said members, said rotary member and said blocks having co-operating surfaces for causing rotation in one direction to tilt the blocks one way and rotation in the other direction to tilt the blocks the other way due to said shift of position.

5. A bearing comprising stationary and rotary members and a bearing block therebetween adapted to slide with respect to one of said members, means for permitting limited shift of position between said block and the other of said members, and the last mentioned of said members and said block having co-operating radially offset surfaces for tilting the block due to said shift of position.

6. A bearing comprising spaced bearing members and a bearing block therebetween, one of said members being grooved to form a bearing shoulder and said block having a bearing surface cooperating with said shoulder to tilt the block.

7. A bearing of the radial type comprising stationary and rotary members and a plurality of bearing blocks having operative positions radially therebetween, projections on one of said members permitting limited shift of position between said blocks and said one of said members, the other of said members and said blocks having relative sliding bearing movement, and said one of said members and said blocks having co-operating radially offset surfaces for tilting the blocks on rotation due to said shift of position.

8. A bearing of the radial type comprising an inner member, an outer member radially spaced from the inner member, and a plurality of bearing blocks having operative positions radially between said members, one of said members having a plurality of axial grooves therein to form a plurality of bearing shoulders adjacent to the edges of the grooves and said blocks having bearing surfaces co-operating with said shoulders to tilt the blocks on rotation.

9. A bearing of the radial type comprising an inner member, an outer member radially spaced from the inner member and a plurality of bearing blocks having operative positions radially between said members, said inner member having a plurality of axial grooves therein to form a plurality of bearing shoulders adjacent to the edges of the grooves and said blocks having bearing surfaces cooperating with said shoulders to tilt the blocks on rotation.

10. A bearing of the radial type comprising stationary and rotary members and a plurality of floating bearing blocks having operative positions radially between said members, projections on one of said members permitting limited shift of position between said blocks and said one of said members, the other of said members and said blocks having relative sliding bearing movement, said one of said members and said blocks having co-operating radially offset surfaces for tilting the blocks on rotation due to said shift of position and the other of said members and said blocks having co-operating spherical bearing surfaces.

11. A bearing of the radial type comprising a stationary member, a rotary member, a plurality of floating bearing blocks having operative positions radially between said members, projections on said rotary member providing spaced abutment surfaces for each block permitting and limiting peripheral movement of the block with respect to the rotary member, said rotary member and said blocks having co-operating radially offset surfaces for tilting the blocks on rotation due to the peripheral movement of the blocks relative to the rotary member and said stationary member and said blocks having co-operating spherical bearing surfaces.

12. A bearing comprising stationary and rotary members, a bearing block therebetween, one of said members and said block each having edges, the edges on the block being spaced differently than the edges on said one of said members, and means for permitting and limiting shift of position of said block relative to said one of said members for causing tilting of the block by causing surfaces adjacent the edges on the respective parts to move on and off each other on successive reversal of direction of rotation.

13. A bearing of the radial type comprising stationary and rotary members and a plurality of bearing blocks having operative positions radially between said members, one of said members and said blocks having adjacent co-operating irregular surfaces acting to tilt the blocks on rotation and prevent relative axial displacement and the other member and said blocks having adjacent co-operating spherical bearing surfaces.

14. A bearing of the radial type comprising stationary and rotary members and a plurality of bearing blocks having operative positions radially between said members, one of said members and said blocks having adjacent co-operating irregular surfaces including essentially flat surfaces at different radial positions acting to tilt the blocks on rotation.

15. A bearing of the radial type comprising stationary and rotary members and a plurality of bearing blocks having operative positions radially between said members, one of said members and said blocks having adjacent co-operating irregular surfaces including essentially flat surfaces at different radial positions acting to tilt the blocks on rotation and permit and limit peripheral play of the blocks.

16. A bearing comprising stationary and rotary members and a bearing block therebetween, one of said members and said block having irregular surfaces forming co-operating offsets and permitting and limiting play of the block for tilting the block due to the block sliding off a surface adjacent an offset on said one of said members.

17. A bearing of the radial type comprising a rotary inner member, a stationary outer member radially spaced from the inner member, and a plurality of bearing blocks between said members, said inner member having a plurality of axial grooves therein and a plurality of circumferential projections thereon, and said bearing blocks having cooperating surfaces adapted to engage shoulders formed at the edges of said grooves to cause the blocks to tilt on rotation and other surfaces adapted to engage said projections to limit axial displacement of the blocks.

18. A bearing of the radial type comprising a rotary inner member, a stationary outer member radially spaced from the inner member, and a plurality of bearing blocks between said members, said inner member having a plurality of axial grooves therein and a plurality of circumferential projections thereon, and said bearing blocks having cooperating surfaces adapted to engage shoulders formed at the edges of said grooves to cause the blocks to tilt on rotation and centrally disposed transverse grooves forming surfaces adapted to engage said projections to limit axial displacement of the blocks.

19. A bearing of the radial type comprising a rotary inner member, a stationary outer member radially spaced from the inner member, and plurality of bearing blocks having operative positions between said members, said inner member having a plurality of circumferential projections thereon comprising projecting portions of different radial extent and said blocks having transverse grooves adapted to receive the projecting portions of lesser radial extent to prevent axial displacement of the blocks, the projecting portions of greater radial extent forming abutments for causing rotation of the blocks with said inner member.

20. A bearing of the radial type comprising a rotary inner member, a stationary outer member radially spaced from the inner member, and a plurality of bearing blocks having operative positions between said members, said inner member having a plurality of circumferential projections thereon comprising projecting portions of different radial extent and said blocks having spaced transverse recesses at their ends to receive the projecting portions of lesser radial extent to prevent axial displacement of the blocks, the projecting portions of greater radial extent forming abutments for causing rotation of the blocks with said inner member.

21. A bearing comprising spaced bearing members and a bearing block therebetween, one of said members being grooved to form spaced bearing shoulders adjacent to the edge of the groove and said block having spaced bearing surfaces adapted to selectively slide on and off said shoulders due to movement of said grooved member in selected direction so that one or the other of said surfaces cooperates with a shoulder to tilt the block in selected direction upon movement in selected direction.

22. A bearing of the radial type comprising an inner member, an outer member radially spaced from the inner member and a plurality of bearing blocks each having peripherally spaced operative positions between said members, one of said members being axially grooved to form opposed spaced bearing shoulders for each of said blocks and each of said blocks having spaced bearing surfaces adapted to selectively slide on and off said shoulders due to peripheral movement of the blocks with respect to the grooved member, said surfaces and said shoulders cooperating to tilt the blocks upon rotation.

23. A bearing of the radial type comprising an inner member, an outer member radially spaced from the inner member, and a plurality of bearing blocks having operative positions between said members, one of said members being axially grooved to form opposed spaced bearing shoulders for each of said blocks, said blocks having spaced bearing surfaces cooperating with said shoulders to tilt the blocks, one of the surfaces of each block being adapted upon causing rotation in selected direction to slide onto one shoulder while the other surface of the block slides off the opposed shoulder into the groove between the shoulders.

24. A bearing of the radial type comprising an inner member, an outer member radially spaced from the inner member, a plurality of bearing blocks each having peripherally spaced operative positions between said members, said inner member being axially grooved to form opposed spaced bearing shoulders for each of said blocks and said blocks having spaced bearing surfaces cooperating with said shoulders to tilt the blocks, one surface of each block being adapted to slide onto one shoulder while the other surface of the block slides off the opposed shoulder into the groove between the shoulders when the block is moved to one of its operative positions, and said other surface of each block being adapted to slide onto the said opposed shoulder while said one surface of the block slides off said one shoulder into the groove between the shoulders when the block is moved to the other of its operative positions, and means forming abutments for permitting and limiting peripheral movement of the blocks with respect to the inner member.

25. A bearing of the radial type comprising an inner member, an outer member radially spaced from the inner member and a plurality of bearing blocks having operative positions radially between said members, each of said blocks having two bearing surfaces adapted to alternatively transmit load between the blocks and one of the members, said one of said members having depressions therein adapted to receive one of said surfaces while load is transmitted through the other surface.

26. A bearing of the radial type comprising an inner member, an outer member radially spaced from the inner member and a plurality of bearing blocks having operative positions radially between said members, each of said blocks having two bearing surfaces adapted to alternatively transmit load between the blocks and one of the members, said one of said members having depressions therein adapted to receive one of said surfaces while load is transmitted through the other surfaces, and the other of said members having a spherical bearing surface.

27. A bearing of the radial type comprising an inner member, an outer member radially spaced from the inner member and a plurality of bearing blocks having operative positions radially between said members, each of said blocks having two bearing surfaces adapted to alternatively transmit load between the blocks and one of the members, said one of said members having projections thereon for limiting movement of the blocks with respect thereto and having depressions therein adapted to receive one of said surfaces while load is transmitted through the other surface.

28. A bearing comprising relatively rotatable spaced members and a plurality of bearing blocks having operative positions between said members, said blocks having portions adapted to be alternately loaded and unloaded on reversal of direction of rotation, one of said members having recesses therein for receiving the unloaded portions of the blocks and having projections cooperating with the blocks for limiting movement of said blocks with respect thereto, said projections and recesses permitting and controlling movement of the blocks on reversal of direction of rotation to mate the unloaded portions with the recesses and the loaded portions with the surfaces with respect to which the recesses are formed.

29. A bearing comprising a first member having a continuous bearing surface, a second member spaced from said first member and having projections extending toward said first member, said members being relatively rotatable, a plurality of bearing blocks between said members having movement relative to both members limited with respect to said second member by said projections, and said second member having surfaces of variable distance from said continuous bearing surface whereby on reversal of rotation to either direction of rotation that portion of each block which will be the forward portion after reversal is moved toward the second member.

30. A radial bearing comprising an outer stationary member having an inner spherical bearing surface, an inner rotary member spaced from said stationary member and having projections extending toward said stationary member, a plurality of bearing blocks radially between said members having movement relative to both members limited with respect to said rotary member by said projections, and said rotary member having surfaces between said projections of variable radial distance from the axis of rotation and from the spherical bearing surface, whereby on reversal of rotation to either direction of rotation that portion of each block which will be the forward portion after reversal is moved toward said rotary member.

31. A radial bearing comprising a stationary member, a rotary member, and a bearing block radially therebetween, said rotary member and said block both having edges, the edges on the block being spaced differently than the edges on the rotary member, and means to permit and limit movement of the block relative to the rotary member to cause tilting of the block by causing peripheral surfaces adjacent edges on the rotary member and the block to move on and off each other on successive reversals of direction of rotation.

32. A radial bearing comprising a stationary member having a spherical bearing surface, a rotary member, and a bearing block radially therebetween having spherical bearing surfaces cooperating with the first-mentioned spherical surface, said rotary member and said block both having edges, the edges on the block being spaced differently apart than the edges on the rotary member, and means to permit and limit movement of the block relative to the rotary member to cause tilting of the block by causing peripheral surfaces adjacent edges on the rotary member and the block to move on and off each other on successive reversals of direction of rotation.

In testimony whereof I have hereunto affixed my signature.

AUGUST GUNNAR FERDINAND WALLGREN.